United States Patent
Harbourt et al.

(10) Patent No.: US 8,704,473 B2
(45) Date of Patent: Apr. 22, 2014

(54) MOTOR FOR A SYNCHRONOUS ELECTRIC MACHINE AND METHOD FOR ROUTING POWER

(75) Inventors: Cyrus David Harbourt, Roanoke, VA (US); Allen Michael Ritter, Salem, VA (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 13/565,854

(22) Filed: Aug. 3, 2012

(65) Prior Publication Data

US 2014/0035498 A1    Feb. 6, 2014

(51) Int. Cl.
*H02P 27/04* (2006.01)
*H02P 6/14* (2006.01)

(52) U.S. Cl.
CPC .................................... *H02P 6/14* (2013.01)
USPC ................. 318/400.26; 318/400.01; 318/700

(58) Field of Classification Search
CPC ..................................... H02P 6/14; H02P 6/08
USPC ............................... 318/400.26, 400.01, 700
See application file for complete search history.

(56) References Cited

U.S. PATENT DOCUMENTS

| | | | |
|---|---|---|---|
| 6,118,932 A | 9/2000 | Maurio et al. | |
| 6,232,731 B1 | 5/2001 | Chapman | |
| 7,109,681 B2 | 9/2006 | Baker et al. | |
| 7,439,697 B2 * | 10/2008 | Miyazaki et al. | 318/400.41 |

FOREIGN PATENT DOCUMENTS

WO    2011063006 A1    5/2011

* cited by examiner

*Primary Examiner* — David Luo
(74) *Attorney, Agent, or Firm* — Cantor Colburn LLP

(57) ABSTRACT

A motor for a synchronous electric machine includes a first inverter configured to provide alternating current power at a first plurality of phases. Also included is a second inverter configured to provide alternating current power at a second plurality of phases. Further included is a first stator winding and a second stator winding each in operable communication with the first inverter and the second inverter and configured to operate synchronously at a first phase, a second phase and a third phase. Yet further included is a first interphase transformer for receiving one of the first plurality of phases and one of the second plurality of phases for communicating a pair of simultaneous, matching voltage outputs to the first stator winding and the second stator winding for reducing a stress imposed on a rotor.

20 Claims, 3 Drawing Sheets

MOTOR FOR A SYNCHRONOUS ELECTRIC MACHINE AND METHOD FOR ROUTING POWER

BACKGROUND OF THE INVENTION

The subject matter disclosed herein relates to electric motors, and more particularly to synchronous electric machines having multiple inverters, as well as a method for routing power to such electric motors.

A number of pulse-width modulation (PWM) inverters have been developed for converting direct current (DC) power or fixed frequency alternating current (AC) power to variable frequency AC power for the purpose of driving large AC synchronous motors at variable speeds. The use of such PWM inverters allows operation of higher rating motors incorporating conventional lamination and conductor types by attaching a polyphase, such as a 3-phase, inverter to each of two or more 3-phase stator windings to achieve high system power ratings.

Despite adequate performance by the PWM inverters in such applications, relatively minor voltage differences between the inverter outputs is often present due to sampling errors, timing errors or current regulator activity, for example. Although the voltage differences are typically present for a relatively short amount of time, such as a few microseconds, the voltage differences drive stray flux through the rotor laminations of the synchronous motor. The stray flux generates currents in the laminations that ultimately may lead to loosening of amortisseur bars in a rotor and subsequently may result in damage to various components, such as the stator, for example, and in extreme cases an overall system failure.

BRIEF DESCRIPTION OF THE INVENTION

According to one aspect of the invention, a motor for a synchronous electric machine includes a first inverter configured to provide alternating current power at a first plurality of phases. Also included is a second inverter configured to provide alternating current power at a second plurality of phases. Further included is a first stator winding and a second stator winding each in operable communication with the first inverter and the second inverter and configured to operate synchronously at a first phase, a second phase and a third phase. Yet further included is a first interphase transformer for receiving one of the first plurality of phases and one of the second plurality of phases for communicating a pair of simultaneous, matching voltage outputs to the first stator winding and the second stator winding for reducing a stress imposed on a rotor.

According to another aspect of the invention, a motor for a synchronous electric machine includes a first inverter configured to receive direct current power from a first power source and output alternating current power at a first inverter first phase, a first inverter second phase and a first inverter third phase. Also included is a second inverter configured to receive direct current power from a second power source and output alternating current power at a second inverter first phase, a second inverter second phase and a second inverter third phase. Further included is a first stator winding and a second stator winding each in operable communication with the first inverter and the second inverter and configured to operate synchronously at a first phase, a second phase and a third phase. Yet further included is a first interphase transformer for receiving the first inverter first phase and the second inverter first phase for communicating a pair of simultaneous, matching voltage outputs at the first phase to the first stator winding and the second stator winding.

According to yet another aspect of the invention, a method for routing power to an electric motor of a synchronous electric machine is provided. The method includes providing power to a first inverter and a second inverter. Also included is outputting from the first inverter a first inverter first phase, a first inverter second phase and a first inverter third phase. Further included is outputting from the second inverter a second inverter first phase, a second inverter second phase and a second inverter third phase. Yet further included is coupling the first inverter first phase and the second inverter first phase through a first interphase transformer for communicating a pair of simultaneous, matching voltage outputs to a first stator winding and a second stator winding at a corresponding first phase.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
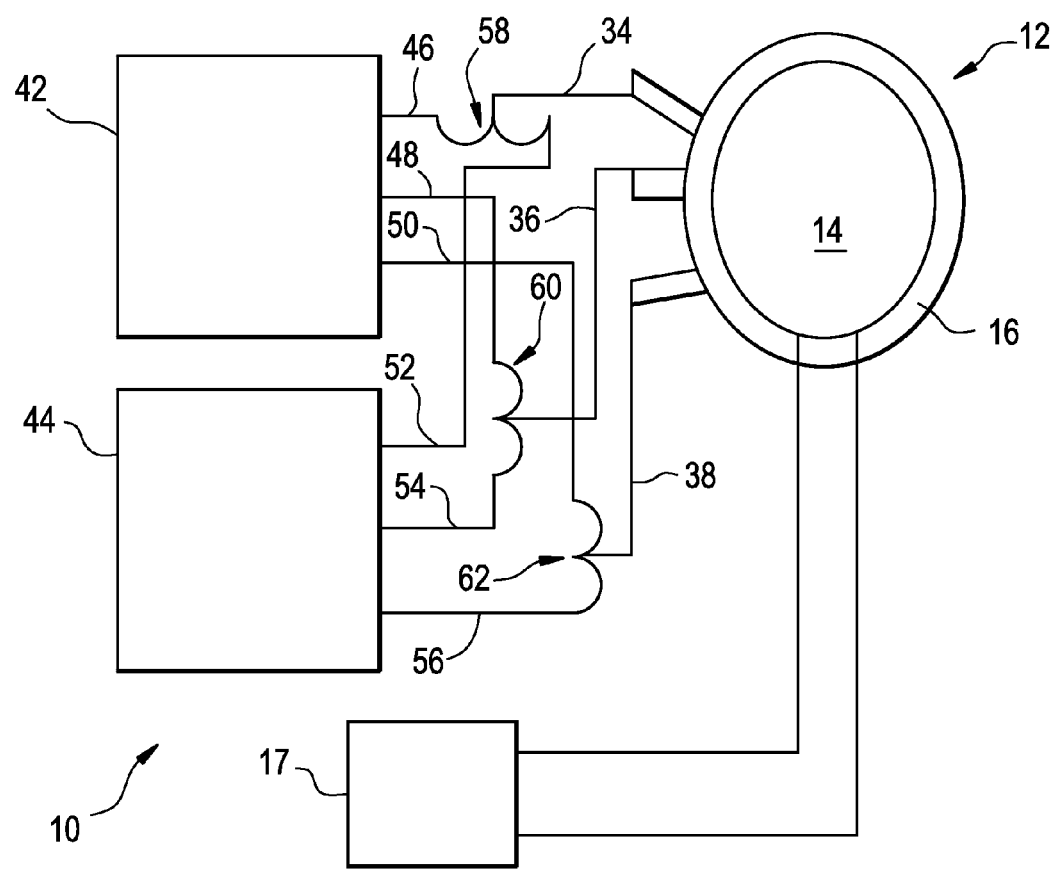
FIG. 1 is a schematic illustration of a synchronous electric machine.
Figure 2:
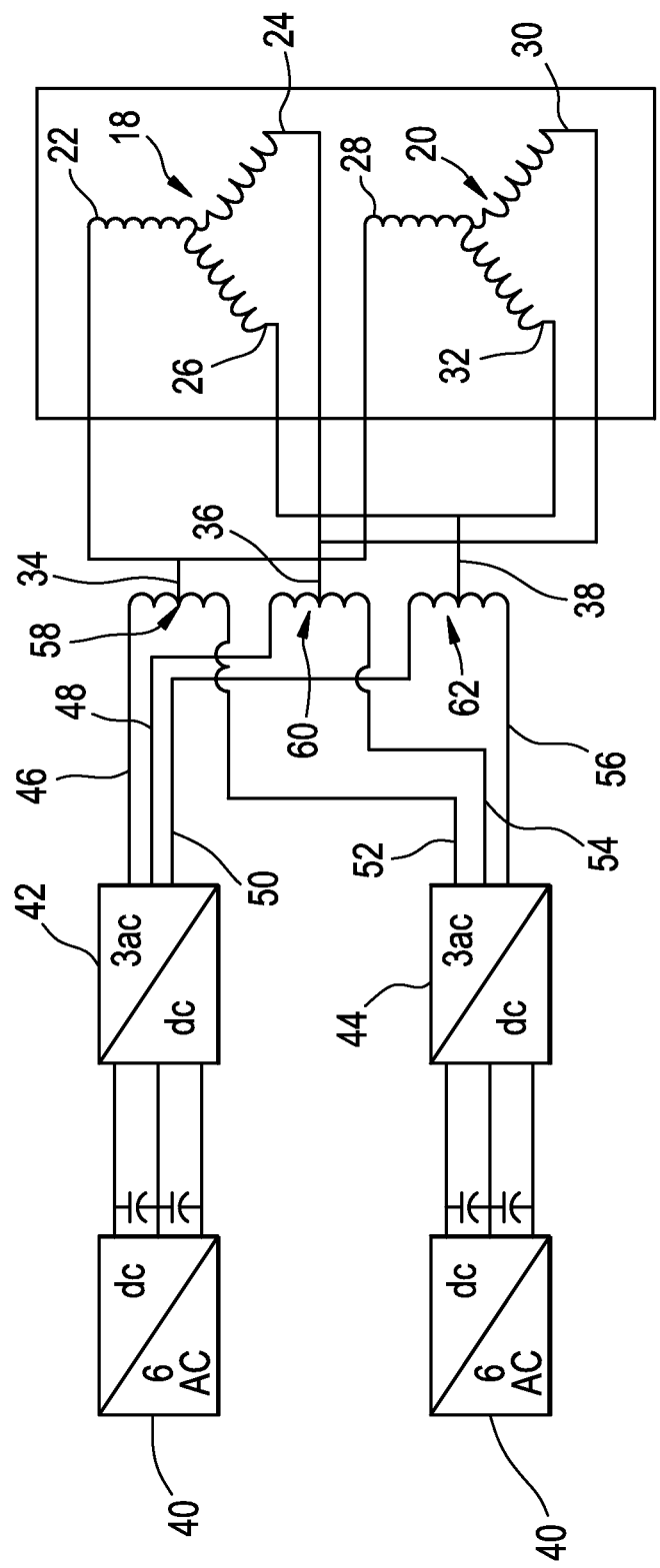
FIG. 2 is a schematic illustration of multiple inverters routing power to multiple stator windings of the synchronous electric machine.

With reference to FIGS. 1 and 2, a synchronous electric machine is schematically illustrated and referred to generally with numeral 10. The synchronous electric machine 10 includes a motor 12 having a motor rotor 14, a motor stator 16 and a field winding 17 comprising a number of coils in communication with the motor stator 16 to produce a magnetic field. The motor stator 16 includes at least one, but typically a plurality of stator windings, such as a first stator winding 18 and a second stator winding 20, as illustrated in FIG. 2. Each of the first stator winding 18 and the second stator winding 20 typically comprises 3-phase windings, with the first stator winding 18 having a first winding terminal 22, a second winding terminal 24 and a third winding terminal 26. Similarly, the second stator winding 20 includes three winding terminals, referenced herein as a fourth winding terminal 28, a fifth winding terminal 30 and a sixth winding terminal 32. It is to be appreciated that the first stator winding 18 and the second stator winding 20 are configured to operate "in phase," such that the first winding terminal 22 is in synchronized operation with the fourth winding terminal 28 at a first phase 34. Additionally, the second winding terminal 24 is in synchronized operation with the fifth winding terminal 30 at a second phase 36, while the third winding terminal 26 is in synchronized operation with the sixth winding terminal 32 at a third phase 38.

At least one power source 40 is employed to drive the first stator winding 18 and the second stator winding 20, and therefore the motor rotor 14 and more generally the synchronous electric machine 10. The at least one power source 40 may be initially provided in the form of an alternating current (AC) power source or a direct current (DC) power source. In the case of the AC power source, at least one rectifier converts the provided power to DC power which is routed to a first inverter 42 and a second inverter 44. In the case of the DC power source, the power is simply provided to the first inverter 42 and the second inverter 44. Irrespective of whether the at least one power source 40 initially generates AC power or DC power, the first inverter 42 and the second inverter 44 operably receive DC power.

Both the first inverter 42 and the second inverter 44 are pulse-width modulation (PWM) inverters configured to convert DC power to 3-phase AC power. Specifically, the first inverter 42 outputs a first inverter first phase 46, a first inverter second phase 48 and a first inverter third phase 50. Similarly, the second inverter 44 outputs a second inverter first phase 52, a second inverter second phase 54 and a second inverter third phase 56. Theoretically, the first inverter first phase 46 is synchronized to match the second inverter first phase 52. The same is true for the first inverter second phase 48 with the second inverter second phase 54 and the first inverter third phase 50 with the second inverter third phase 56. In practice, instantaneous voltage output differences between "in phase" pairs (46 and 52, 48 and 54 or 50 and 56) of the first inverter 42 and the second inverter 44 may be present in any of the pairs of output phases as noted. To account for potential output differences from the first inverter 42 and the second inverter 44, at least one, but typically a plurality of interphase transformers are in operable communication with the output phases of the first inverter 42 and the second inverter 44. Specifically, a first interphase transformer 58 is disposed in communication with the first inverter first phase 46 and the second inverter first phase 52. Similarly, a second interphase transformer 60 is disposed in communication with the first inverter second phase 48 and the second inverter second phase 54, while a third interphase transformer 62 is disposed in communication with the first inverter third phase 50 and the second inverter third phase 56. It is to be appreciated that the precise number of interphase transformers may vary depending on the particular application of use, with the illustrated and above-described embodiment(s) typically being employed for a 3-phase inverter output and electric machine operation.

Each of the first interphase transformer 58, the second interphase transformer 60 and the third interphase transformer 62 receive outputs from the first inverter 42 and the second inverter 44 and absorb the above-noted potential voltage output differences and subsequently output respective simultaneous, matching voltage outputs. The simultaneous, matching voltage outputs refer to the previously described first phase 34, second phase 36 and third phase 38. The first interphase transformer 58, the second interphase transformer 60 and the third interphase transformer 62 are also in communication with the motor stator 16, and more particularly the first stator winding 18 and the second stator winding 20. Specifically, the first interphase transformer 58 is configured to route the first phase 34 to the first winding terminal 22 and the fourth winding terminal 28. The second interphase transformer 60 is configured to route the second phase 36 to the second winding terminal 24 and the fifth winding terminal 30. The third interphase transformer 62 is configured to route the third phase 38 to the third winding terminal 26 and the sixth winding terminal 32.

Figure 3:
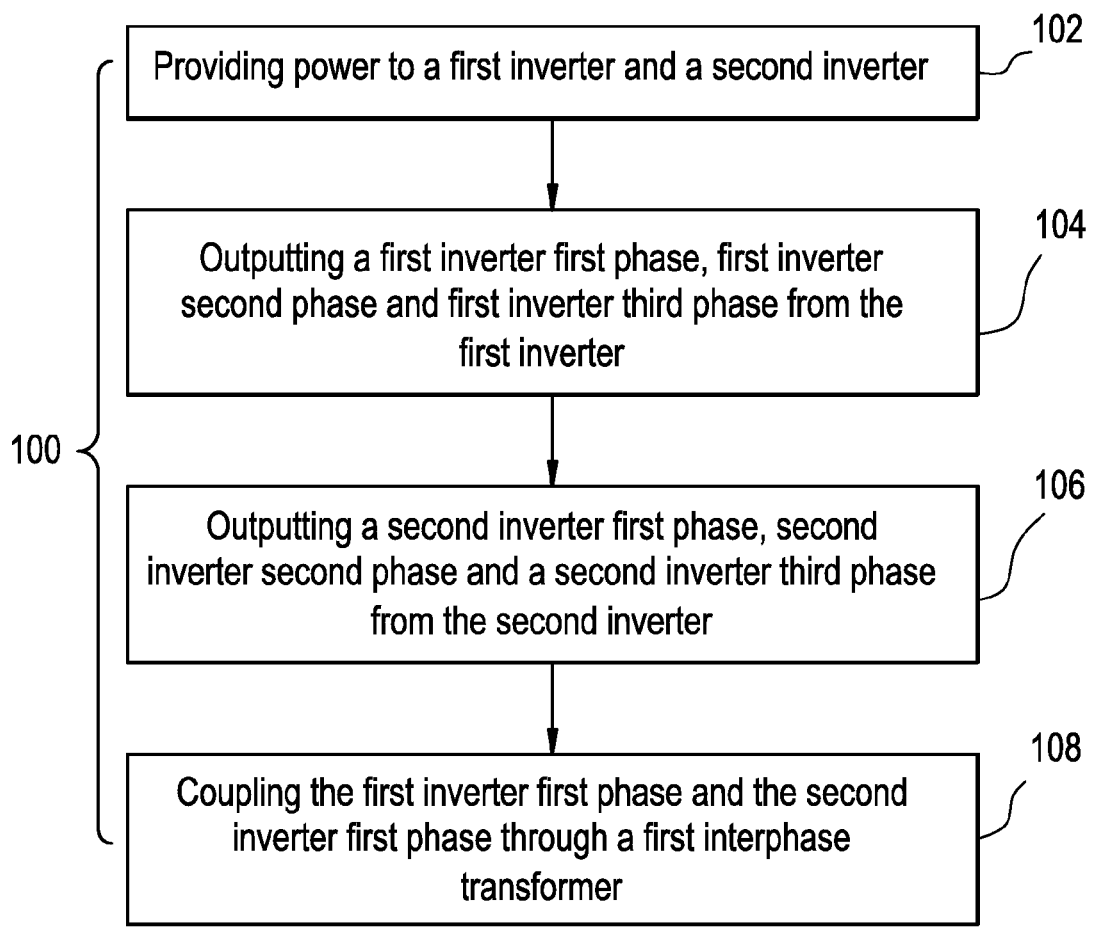
FIG. 3 is a flow diagram illustrating a method for routing power to an electric motor of the synchronous electric machine.

As illustrated in the flow diagram of FIG. 3, and with reference to FIGS. 1 and 2, a method of routing power 100 to an electric motor of the synchronous electric machine 10 is also provided. The synchronous electric machine 10 has been previously described and specific structural components need not be described in further detail. The method of routing power 100 includes providing power to a first inverter and a second inverter 102. The previously described first inverter first phase 46, the first inverter second phase 48 and the first inverter third phase 50 are outputted from the first inverter 104, while the second inverter first phase 52, the second inverter second phase 54 and the second inverter third phase 56 are outputted from the second inverter 106. The first inverter first phase 46 and the second inverter first phase 52 are coupled 108 through the first interphase transformer 58 to communicate a pair of simultaneous, matching voltage outputs to the first stator winding 18 and the second stator winding 20 at the first phase 34.

Advantageously, the above-described structure and method utilizes one or more interphase transformers between phases of two or more inverters used to drive multi-winding motors to mitigate small voltage differences between the inverter outputs. Such a structure and method reduce stresses imposed on the rotor of the electric motor, thereby diminishing the likelihood of damage to the rotor structure and/or failure of the rotor structure leading to damage of the stator structure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A motor for a synchronous electric machine comprising:
a first inverter configured to provide alternating current power at a first plurality of phases;
a second inverter configured to provide alternating current power at a second plurality of phases;
a first stator winding and a second stator winding each in operable communication with the first inverter and the second inverter and configured to operate synchronously at a first phase, a second phase and a third phase; and
a first interphase transformer for receiving one of the first plurality of phases and one of the second plurality of phases for communicating a pair of simultaneous, matching voltage outputs to the first stator winding and the second stator winding for reducing a stress imposed on a rotor.

2. The motor for a synchronous electric machine of claim 1, wherein the first plurality of phases and the second plurality of phases are each three phase.

3. The motor for a synchronous electric machine of claim 1, wherein the first stator winding includes a first winding terminal, a second winding terminal and a third winding terminal, wherein the second stator winding includes a fourth winding terminal, a fifth winding terminal and a sixth winding terminal.

4. The motor for a synchronous electric machine of claim 3, wherein the first interphase transformer operably couples a first inverter first phase and a second inverter first phase to communicate the pair of simultaneous, matching voltage outputs to the first winding terminal and the fourth winding terminal.

5. The motor for a synchronous electric machine of claim 3, wherein a second interphase transformer operably couples a first inverter second phase and a second inverter second phase to communicate the pair of simultaneous, matching voltage outputs to the second winding terminal and the fifth winding terminal.

6. The motor for a synchronous electric machine of claim 3, wherein a third interphase transformer operably couples a first inverter third phase and a second inverter third phase to communicate the pair of simultaneous, matching voltage outputs to the third winding terminal and the sixth winding terminal.

7. The motor for a synchronous electric machine of claim 1, further comprising a plurality of interphase transformers operably coupling one of the first plurality of phases and one of the second plurality of phases.

8. The motor for a synchronous electric machine of claim 1, wherein the first inverter and the second inverter are each pulse-width modulation inverters.

9. The motor for a synchronous electric machine of claim 1, wherein the first interphase transformer absorbs instantaneous voltage differences between a first inverter voltage and a second inverter voltage.

10. A motor for a synchronous electric machine comprising:
a first inverter configured to receive direct current power from a first power source and output alternating current power at a first inverter first phase, a first inverter second phase and a first inverter third phase;
a second inverter configured to receive direct current power from a second power source and output alternating current power at a second inverter first phase, a second inverter second phase and a second inverter third phase;
a first stator winding and a second stator winding each in operable communication with the first inverter and the second inverter and configured to operate synchronously at a first phase, a second phase and a third phase; and
a first interphase transformer for receiving the first inverter first phase and the second inverter first phase for communicating a pair of simultaneous, matching voltage outputs at the first phase to the first stator winding and the second stator winding.

11. The motor for a synchronous electric machine of claim 10, wherein communication of the pair of simultaneous, matching voltage outputs reduces a stress imposed on a rotor.

12. The motor for a synchronous electric machine of claim 10, wherein the first stator winding includes a first winding terminal, a second winding terminal and a third winding terminal, wherein the second stator winding includes a fourth winding terminal, a fifth winding terminal and a sixth winding terminal.

13. The motor for a synchronous electric machine of claim 12, wherein the first interphase transformer communicates the pair of simultaneous, matching voltage outputs to the first winding terminal and the fourth winding terminal.

14. The motor for a synchronous electric machine of claim 12, wherein a second interphase transformer operably couples the first inverter second phase and the second inverter second phase to communicate the pair of simultaneous, matching voltage outputs to the second winding terminal and the fifth winding terminal.

15. The motor for a synchronous electric machine of claim 12, wherein a third interphase transformer operably couples the first inverter third phase and the second inverter third phase to communicate the pair of simultaneous, matching voltage outputs to the third winding terminal and the sixth winding terminal.

16. The motor for a synchronous electric machine of claim 10, wherein the first inverter and the second inverter are each pulse-width modulation inverters.

17. The motor for a synchronous electric machine of claim 10, wherein the first interphase transformer absorbs instantaneous voltage differences between a first inverter voltage and a second inverter voltage.

18. A method for routing power to an electric motor of a synchronous electric machine comprising:
providing power to a first inverter and a second inverter;
outputting from the first inverter a first inverter first phase, a first inverter second phase and a first inverter third phase;
outputting from the second inverter a second inverter first phase, a second inverter second phase and a second inverter third phase; and
coupling the first inverter first phase and the second inverter first phase through a first interphase transformer for communicating a pair of simultaneous, matching voltage outputs to a first stator winding and a second stator winding at a corresponding first phase.

19. The method of claim 18, further comprising coupling the first inverter second phase and the second inverter second phase through a second interphase transformer and coupling the first inverter third phase and the second inverter third phase through a third interphase transformer.

20. The method of claim 18, further comprising absorbing an instantaneous voltage difference between a first inverter voltage and a second inverter voltage with the first interphase transformer.

* * * * *